(12) United States Patent
Kojima et al.

(10) Patent No.: US 8,308,147 B2
(45) Date of Patent: Nov. 13, 2012

(54) VIBRATION DAMPER

(75) Inventors: Hiroshi Kojima, Yokohama (JP);
Yoshitaka Otsubo, Saga (JP)

(73) Assignee: Bridgestone Corporation, Tokyo (JP)

( * ) Notice: Subject to any disclaimer, the term of this patent is extended or adjusted under 35 U.S.C. 154(b) by 799 days.

(21) Appl. No.: 12/296,318

(22) PCT Filed: Apr. 6, 2007

(86) PCT No.: PCT/JP2007/057782
§ 371 (c)(1),
(2), (4) Date: Mar. 25, 2009

(87) PCT Pub. No.: WO2007/116976
PCT Pub. Date: Oct. 18, 2007

(65) Prior Publication Data
US 2009/0283945 A1    Nov. 19, 2009

(30) Foreign Application Priority Data

Apr. 7, 2006  (JP) ................. 2006-105910

(51) Int. Cl.
*F16F 5/00*    (2006.01)
(52) U.S. Cl. .................. 267/140.12; 267/140.13
(58) Field of Classification Search ......... 188/140.11, 188/140.12, 140.13, 141, 141.2, 141.3, 141.4; 267/140.11, 140.12, 140.13, 141, 141.2, 267/141.3, 141.4
See application file for complete search history.

(56) References Cited

U.S. PATENT DOCUMENTS

| | | | |
|---|---|---|---|
| 5,172,893 A * | 12/1992 | Bouhier et al. ........ | 267/140.12 |
| 6,663,090 B2 * | 12/2003 | Simuttis et al. ........ | 267/140.13 |
| 6,820,867 B2 * | 11/2004 | Satori et al. ........... | 267/140.13 |
| 7,044,455 B2 * | 5/2006 | Yoshida et al. ........ | 267/140.13 |
| 7,458,565 B2 * | 12/2008 | Miyahara .............. | 267/140.11 |
| 2008/0237952 A1 * | 10/2008 | Nishi .................... | 267/140.13 |
| 2009/0026670 A1 * | 1/2009 | Kojima et al. .......... | 267/121 |
| 2010/0096787 A1 * | 4/2010 | Kojima .................. | 267/140.13 |
| 2011/0001281 A1 * | 1/2011 | Kanaya et al. ......... | 267/140.13 |
| 2011/0042870 A1 * | 2/2011 | Kojima .................. | 267/140.11 |

FOREIGN PATENT DOCUMENTS

| | | |
|---|---|---|
| JP | 2002-310219 A | 10/2002 |
| JP | 20002-32778 A | 11/2002 |
| JP | 2004-68938 A | 3/2004 |
| WO | 2006/035886 A1 | 4/2006 |

\* cited by examiner

*Primary Examiner* — Bradley King
*Assistant Examiner* — Nicholas J Lane
(74) *Attorney, Agent, or Firm* — Sughrue Mion, PLLC

(57) ABSTRACT

A vibration damper with improved durability achieved by preventing stress concentration in a partition wall portion to avoid an excessive increase in strain in that portion. An intermediate cylinder member (20) is fitted to the inner peripheral surface of an outer cylindrical member (16), and a rubber elastic body (22) is arranged between a mounting member (18) and the intermediate cylinder member (20) to elastically connect them. A first and a second hollow cavities are formed in those regions of the rubber elastic body (22) which correspond to regions in the inner peripheral side of a small diameter portion (20B) of the intermediate cylinder member (20). Partition wall portion (22D) for partitioning the hollow cavities from each other are formed in regions of the rubber elastic body (22) between the first and second hollow cavities. The partition wall portion (22D) of the rubber elastic body (22) has both ends (23) fitted into a pair of openings (44, 46) of the intermediate cylinder member (20) so as to project from the openings (44, 46) toward the outer cylinder member (16).

9 Claims, 11 Drawing Sheets

(a)

(b)

VIBRATION DAMPER

TECHNICAL FIELD

The present invention relates to a liquid-type vibration damper for absorbing a vibration from a vibration generating section, such as an engine, and thereby preventing transmission of the vibration to a vibration receiving section, such as a vehicle body. A vibration damper of this type is typically used in general industrial machines, or as an engine mount member for automobiles.

BACKGROUND ART

For example, an engine mount in the form of a vibration damper is arranged between an engine as the vibration generating section and a vehicle body as the vibration receiving section, so as to absorb the vibration generated by the engine and thereby prevent transmission of the vibration to the vehicle body side. As such a vibration damper, there is known a liquid-type damper provided in its interior with an elastic body, pressure receiving liquid chambers, an auxiliary liquid chamber, etc., wherein the pressure receiving liquid chambers are communicated with the auxiliary liquid chamber through restricting passages in the form of orifices.

In such a liquid-type vibration damper, when a vibration is generated upon operation of the engine as being mounted on a vehicle, the vibration is absorbed by a vibration damping function of the elastic body and the viscosity resistance of the liquid flowing through the orifices that communicate the pressure receiving liquid chambers and the auxiliary liquid chamber, so as to prevent transmission of the vibration to the vehicle body side.

Conventional structure of such a liquid-type vibration damper is disclosed in various patent documents. For example, Japanese Patent Application Laid-open Publication No. 2004-068938 discloses a vibration damper having a structure including an elastic body arranged on the inside of an intermediate cylinder member as being adhered to each other, an upper liquid chamber as a pressure receiving liquid chamber for damping a vertical vibration that is the axial direction of the vibration damper, and a lower liquid chamber as an auxiliary liquid chamber in communication with the upper liquid chamber.

Moreover, in addition to these liquid chambers, a plurality of circumferential liquid chambers are provided so as to achieve damping of a vibration in a for-and-aft direction intersecting the vertical direction or in a left-and-right direction. These circumferential liquid chambers are partitioned by a partition wall portion of the elastic body.

DISCLOSURE OF THE INVENTION

Task to be Solved by the Invention

In the conventional vibration damper having the above-mentioned structure, because the partition wall portion of the elastic body and the intermediate cylinder member are adhered to each other, when an input vibration with a large amplitude is applied in the axial direction and the elastic body is significantly deformed, stress concentration tends to occur in the partition wall portion that is made of rubber, thereby causing excessive strain and fatigue at this portion, and lowering the durability of the vibration damper. Moreover, when the weight of the engine is partly supported by the vibration damper in a shared manner, stress concentration tends to occur at a vulcanized interface between the intermediate cylinder member and the partition wall portion of the elastic body, thereby causing excessive strain and fatigue at this portion, and making it difficult to achieve a sufficient durability of the partition wall portion in the vulcanized interface and its neighboring regions. In view of the above-mentioned problems of the prior art, it is a primary object of the present invention to provide a vibration damper having an improved durability, and capable of preventing a stress concentration and avoiding an excessive strain at the partition wall portion.

Means for Solving the Task

A first aspect of the present invention resides in a vibration damper, which comprises:
a first mounting member having substantially cylindrical shape, and connected to one of a vibration generation section and a vibration receiving section;
a second mounting member arranged on radially inside of the first mounting member, and connected to the other of the vibration generation section and the vibration receiving section;
an intermediate cylinder member fitted to an inner peripheral surface of the first mounting member, and having an opening extending therethrough;
an elastic body arranged between the intermediate cylinder member and the second mounting member, for connecting the intermediate cylinder member and the second mounting member so as to be elastically deformable relative to each other;
a first pressure receiving liquid chamber arranged in radially inside of the intermediate cylinder member, having an inner wall that is at least partly formed by the elastic body, and adapted to be filled with a liquid;
an auxiliary liquid chamber in communication with the first pressure receiving liquid chamber, having a partition wall that is partly deformable so as to change its internal volume upon a change in the liquid pressure;
a pair of second pressure receiving liquid chambers formed in regions of the elastic body on both sides of the intermediate cylinder member, and adapted to be filled with the liquid; and
a partition wall portion arranged in a region of the elastic body corresponding to the opening of the intermediate cylinder member so as to partition the pair of the second pressure receiving liquid chambers.

In operation of the vibration damper according to the first aspect of the present invention, when an input vibration is applied to the vibration damper from the side of the vibration generation section, through one of the first and second mounting members, the elastic body arranged between the intermediate cylinder member, on one hand, which is fitted to the inner peripheral surface of the first mounting member, and the second mounting member, on the other hand, undergoes an elastic deformation to absorb the vibration by the damping function of the elastic member due to its internal friction, etc., so as to suppress the vibration that is transmitted to the vibration receiving section. Thus, the input vibration is partly absorbed by the damping function of the elastic body, irrespectively of whether the vibration is applied in the main amplitude direction substantially coinciding with the axial direction of the vibration damper, or in the auxiliary amplitude direction intersecting at substantially right angles to the main amplitude direction.

Furthermore, the vibration damper according to the first aspect of the present invention has a structural feature wherein the first pressure receiving liquid chamber having an inner wall, which is at least partly formed of an elastic body, is arranged on the inner peripheral side of the intermediate cylinder member which, in turn, is fitted to the inner peripheral surface of the first mounting member, and the first pressure receiving liquid chamber is in communication with the auxiliary liquid chamber having a partition wall which is partly deformable. Thus, when the first mounting member or the second mounting member is applied with an input vibration from the side of the vibration generation section, in the main amplitude direction, the elastic body undergoes an elastic deformation in the main amplitude direction to increase or decrease the internal volume of the first pressure receiving liquid chamber.

Accordingly, as the liquid is communicated between the auxiliary liquid chamber having an internal volume that increases or decreases in response to the change in the liquid pressure and the first pressure receiving liquid chamber, a resonance phenomena occurs to the liquid synchronously with the input vibration, so that the change in pressure and the viscosity resistance caused by the resonance phenomena serve effectively to absorb the input vibration in the main amplitude direction.

Moreover, when the first mounting member or the second mounting member is applied with an input vibration from the side of the vibration generation section, in the auxiliary amplitude direction, the elastic body undergoes an elastic deformation in the auxiliary amplitude direction to alternately increase or decrease the internal volume of the pair of the second pressure receiving liquid chamber. Accordingly, as the liquid is communicated between the second pressure receiving liquid chambers forming a pair, or between the second pressure receiving liquid chamber and the auxiliary liquid chamber, the change in pressure and the viscosity resistance caused by the resonance phenomena of the liquid serve effectively to absorb the input vibration in the auxiliary amplitude direction.

On the other hand, the intermediate cylinder member is provided with an opening extending radially through the intermediate cylinder member, and a partition wall portion defining the pair of the second pressure receiving liquid chambers is arranged in the region of the elastic body corresponding to the opening, as being fitted into the opening. Thus, the vibration damper has a structure wherein the partition wall portion defining the pair of the second pressure receiving liquid chambers is not adhered to the intermediate cylinder member. Since the partition wall portion is not adhered to the intermediate cylinder member, even when an input vibration having such a magnitude as to induce a large deformation of the partition wall portion of the elastic body is applied to the vibration damper from the vibration generation section, the partition wall portion is allowed to freely deform and achieve a stress relaxation, to thereby avoid fatigue of the partition wall portion and improve the durability of the vibration damper.

A second aspect of the present invention resides in a vibration damper according to the first aspect, wherein the pair of the second pressure receiving liquid chambers are in communication with the auxiliary liquid chamber, respectively. In other words, because the second pressure receiving liquid chambers forming a pair are each communicated to the auxiliary liquid chamber, resonance phenomena occurs to the liquid flowing between the pair of the second pressure receiving liquid chambers and the auxiliary liquid chamber, synchronously with the input vibration, and the pressure change of the liquid due to the resonance and the viscosity resistance serve to effectively absorb the input vibration in the auxiliary amplitude direction.

A third aspect of the present invention resides in a vibration damper, which provides the same function as the vibration damper according to the first or second aspect. According to the third aspect, however, the partition wall portion of the elastic body is fitted in the opening of the intermediate cylinder member so as to project from the opening toward the side of the first mounting member. In this instance, since the partition wall portion of the elastic body, which is fitted in the opening of the intermediate cylinder member and projects toward the side of the first mounting member, achieves a sealing function in abutment with the first mounting member, or with an intermediate member arranged between the partition wall portion of the elastic body and the first mounting member, it is possible positively to prevent leakage of the liquid within the pair of the second pressure receiving liquid chambers.

A fourth aspect of the present invention resides in a vibration damper, which provides the same function as the vibration damper according to any one of the first to third aspects. According to the fourth aspect, however, the intermediate cylinder member has a pair of said openings, and both end regions of the partition wall portion of the elastic body are fitted into the pair of the openings, respectively.

In this instance, since both end regions of the partition wall portion of the elastic body are fitted into the pair of the openings, respectively, it is possible to more positively avoid adhesion of the partition wall portion to the intermediate cylinder member. Moreover, since the partition wall portion is more freely deformable while positively preventing leakage of the liquid within the pair of the second pressure receiving liquid chambers, the stress occurring at the partition wall portion is further mitigated to provide a further improved durability.

A fifth aspect of the present invention resides in a vibration damper, which provides the same function as the vibration damper according to any one of the first to fourth aspects. According to the fifth aspect, however, the first pressure receiving liquid chamber is arranged opposite to an end portion of the second mounting member, and the second pressure receiving liquid chambers forming the pair are arranged symmetrically, on both sides of the second mounting member. This structure provides an optimum arrangement of the first pressure receiving liquid chamber and the pair of the second pressure receiving liquid chambers, within a narrow internal space of the vibration damper, thereby allowing realization of a small-sized vibration damper with an improved durability.

A sixth aspect of the present invention resides in a vibration damper, which provides the same function as the vibration damper according to any one of the first to fifth aspects. According to the sixth aspect, however, the region of the elastic body projecting from the opening of the intermediate cylinder and the side of the first mounting member are in pressure contact with each other without being adhered to each other. Thus, in addition to the advantages explained above, it is possible to ensure that the above-mentioned stress concentration or strain at the adhesion surface that would be formed due to vulcanization, or at the vicinity of such adhesion surface, is absorbed by the displacement or deformation of the partition wall portion of the elastic body, which is in pressure contact with the first mounting member in the form of an outer cylinder, for example, to further improve the durability of the vibration damper, even if it is applied with the shared weight of the engine.

A seventh aspect of the present invention resides in a vibration damper according to any one of the preceding aspects, further comprising passages for communicating the pair of the second pressure receiving liquid chambers to the auxiliary liquid chamber, respectively, wherein these passages are tuned to correspond to a frequency of an idling vibration, which is higher than a frequency of a shaking vibration. In this instance, when an idling vibration with a frequency of 20 to 30 Hz is applied from the main amplitude direction and/or the auxiliary amplitude direction, it is possible to sufficiently ensure flow of the liquid between the second pressure receiving liquid chambers and the auxiliary liquid chamber so as to effectively absorb the input vibration under the resonance phenomena of the liquid.

An eighth aspect of the present invention resides in a vibration damper according to any one of the first to sixth aspects, wherein the passages for communicating the pair of the second pressure receiving liquid chambers to the auxiliary liquid chamber are different from each other in flow resistance, for example, in length and/or cross-sectional area of the passages. In this instance, sine the passages are respectively subjected to an independent tuning, it is possible to achieve the damping function with respect to the input vibration in a more wide frequency band.

In this instance, furthermore, as in the vibration damper according to a ninth aspect of the present invention, it is preferred that one of the passages for communicating the pair of the second pressure receiving liquid chambers to the auxiliary liquid chamber is tuned to correspond to a frequency of a shaking frequency of about 8 to 15 Hz, for example, and the other of the passages is tuned to correspond to a frequency of an idling vibration, which is higher than a frequency of the shaking vibration. Such tuning makes it possible to significantly damp both the shaking vibration and the idling vibration.

Effects of the Invention

As explained above, the above-mentioned structure according to the present invention provides an excellent technical effects to realize a vibration damper having an improved durability, and capable of preventing a stress concentration and avoiding an excessive strain at the partition wall portion.

BRIEF DESCRIPTION OF THE DRAWINGS

The present invention will be further described below with reference to preferred embodiments shown in the accompanying drawings, wherein.

REFERENCE NUMERALS

Figure 1:
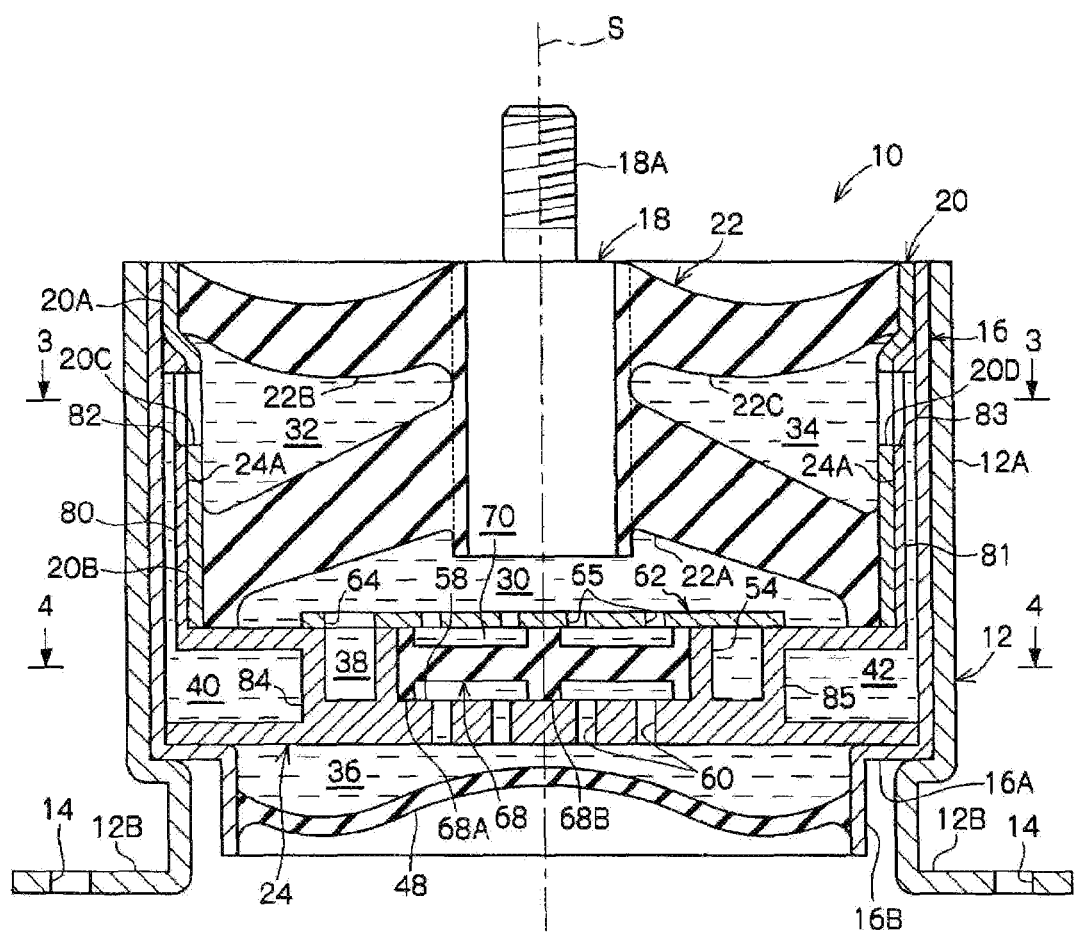
FIG. 1 is a longitudinal sectional view as seen in the direction of arrow 1-1 in FIG. 3, showing a vibration damper according to a first embodiment of the present invention.

10 Vibration damper
16 Outer cylinder member (first mounting member)
18 Mounting member (second mounting member)
20 Intermediate cylinder member
22 Rubbery elastic member (elastic member)
22D Partition wall portion
23 End regions
24, 90 Partition member
30 First pressure receiving liquid chamber
32 Second pressure receiving liquid chamber (left side)
34 Second pressure receiving liquid chamber (right side)
36 Auxiliary liquid chamber
38 First orifice
40, 42 Second orifice
44 First opening
46 Second opening
90A Ring portion
90B Rib
92 First groove portion
93 Second groove portion

BEST MODE FOR CARRYING OUT THE INVENTION

FIGS. 1 to 6 illustrate a vibration damper according to a first embodiment of the present invention, which will be described below. The vibration damper 10 according to the embodiment shown in FIGS. 1 to 4 is used, for example, as an engine mount in an automobile, as being arranged between a vehicle body as a vibration receiving section, and an engine as a vibration generating section, so as to support the engine. In the drawings, reference character S denotes the center axis of the vibration damper. The direction along the center axis S is defined as the axial direction of the vibration damper 10, and the direction intersecting the center axis S at right angles is defined as the radial direction of the vibration damper 10.

As shown in FIG. 1, the vibration damper 10 includes a bracket 12 for connecting and fixing the vibration damper 10 to the vehicle body side. The bracket 12 is provided with a substantially cylindrical holder portion 12A, and a pair of leg portions 12B projecting radially outwards from the lower end of a restriction of the holder portion 12A. Each leg portion 12B of the pair has a tip end formed with a mounting hole 14 for the connection to the vehicle body.

An outer cylinder member 16 in the form of a thin-walled cylinder, which is open at both axial ends, is fitted in the holder portion 12A of the bracket 12, as a first mounting member. A solid cylindrical mounting member 18 is arranged on the radially inner side of the outer cylinder member 16, coaxially to the outer cylinder member 16, as a second mounting member.

The holder portion 12 as a whole, or at least its upper end region, is mechanically deformed radially inwards so that the outer cylinder member 16 is fixed to a predetermined location of the bracket 12 with a sufficient strength. The outer cylinder member 16 has a lower end region, which is formed with a radially inwardly diverted shoulder portion 16A, and also with a small diameter portion 16B extending from the step portion 16A and having a diameter that is smaller than the diameter at the upper end region.

Here, when the vibration damper 10 is connected to the vehicle body side, bolts (not shown) are inserted into the mounting holes 14 in the pair of the leg portions 12B so that the tip ends of the bolts are threaded into, and fixed to the vehicle body side. By this, the vibration damper 10 is fixedly connected to the vehicle body side via the bracket 12.

Furthermore, an intermediate cylinder member 20 formed of a metal material to have a cylindrical shape is fitted to the inner peripheral surface of the outer cylinder member 16. A thick rubber elastic body 22 having a cylindrical shape is arranged between the intermediate cylinder member 20 and the mounting member 18. A recess 22A is provided at the center region in the lower surface of the rubber elastic body 22, which is depressed to have a circular cross-section in a plane intersecting with the axial direction at right angles.

The rubber elastic body 22 has an outer peripheral surface that is connected to the inner peripheral surface of the intermediate cylinder member 20 by vulcanization and resultant adhesion or by fitting, as well as an inner peripheral surface that is connected to the outer peripheral surface of the mounting member 18 by vulcanization and resultant adhesion. By this, the mounting member 18 and the intermediate cylinder member 20 are elastically connected to each other through the rubber elastic body 22.

Figure 2:
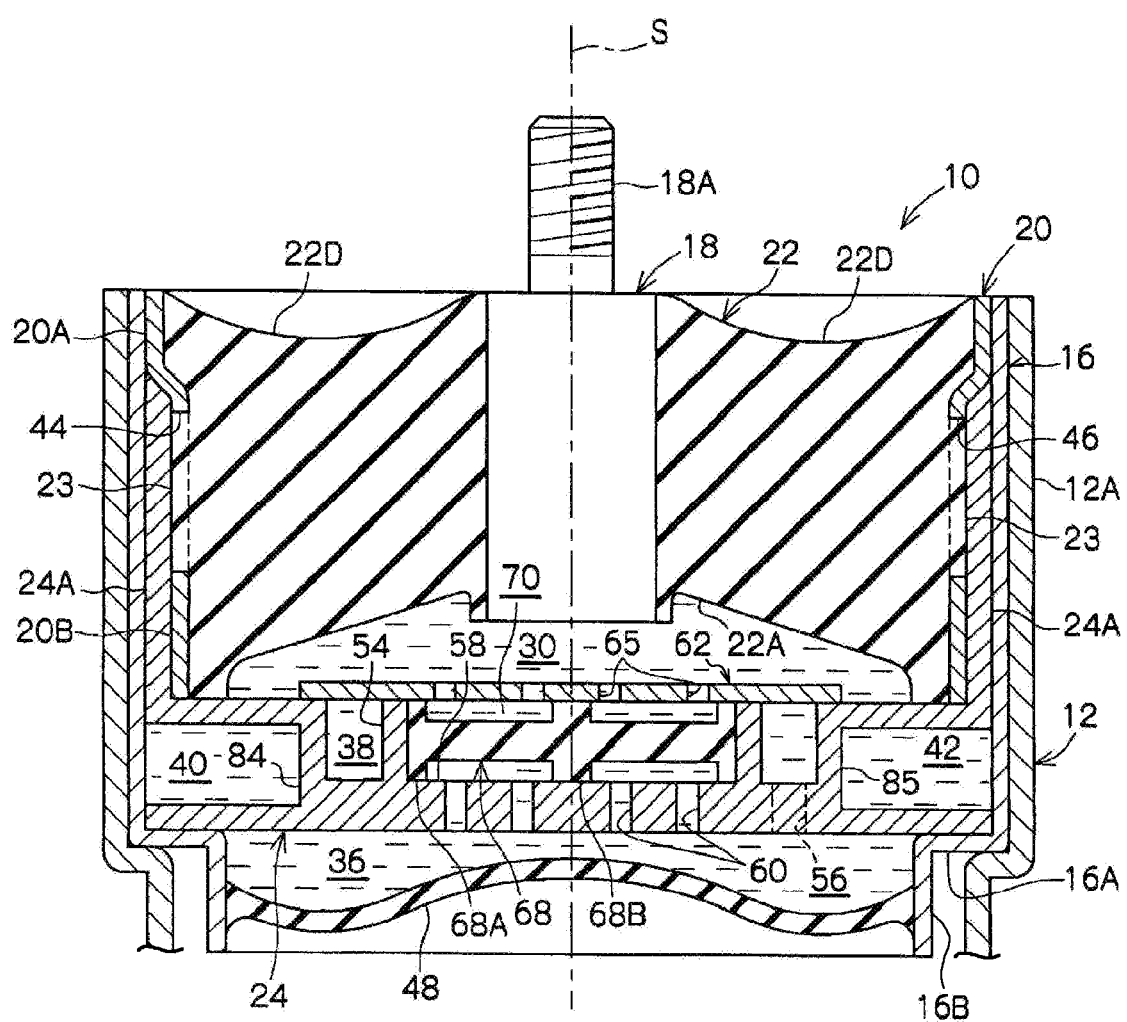
FIG. 2 is a longitudinal sectional view as seen in the direction of arrow 2-2 in FIG. 3, showing the vibration damper according to the first embodiment of the present invention.

On the other hand, as shown in FIGS. 1 and 2, a partition member 24 formed of a metal material to have a thick disc-like shape is inserted into the outer cylinder member 16 so that the outer peripheral portion of the partition member 24 is brought into abutment with the shoulder portion 16A of the outer cylinder member 16. The recess 22A at the lower surface of the rubber elastic body 22 has an outer peripheral portion, which is urged against the outer peripheral portion of the partition member 24.

By this, the partition member 24 closes the lower surface side of the recess 22A to define a space in the recess 22A that is sealed from outside. This space serves as the first pressure receiving liquid chamber 30 that is filled by a liquid, such as ethylene glycol, silicone oil, etc. Thus, the first pressure receiving liquid chamber 30 has an inner wall that is at least partly formed by the rubber elastic body 22.

A s shown in FIGS. 1 and 2, the intermediate cylinder member 20 has an upper region formed by a cylindrical large-diameter portion 20A having a large diameter, as well as a center region and a lower region formed by a cylindrical small-diameter portion 20B that is smaller in diameter than the large-diameter portion 20A, wherein the large-diameter portion 20A and the small-diameter portion 20B are integral with each other through the shoulder portion. Here, the large-diameter portion 20A has an outer diameter that corresponds to the inner diameter of the outer cylinder member 16. The outer peripheral surface of the large-diameter portion 20A is urged against the upper end of the inner peripheral surface of the outer cylinder member 16. The lower end of the small-diameter portion 20B is urged against the upper surface portion of the partition member 24. Thus, the partition member 24 is clamped between the small-diameter portion 20B of the intermediate cylinder member and the shoulder portion 16A of the outer cylinder member 16 and thereby prevented from an axial movement.

Figure 3:
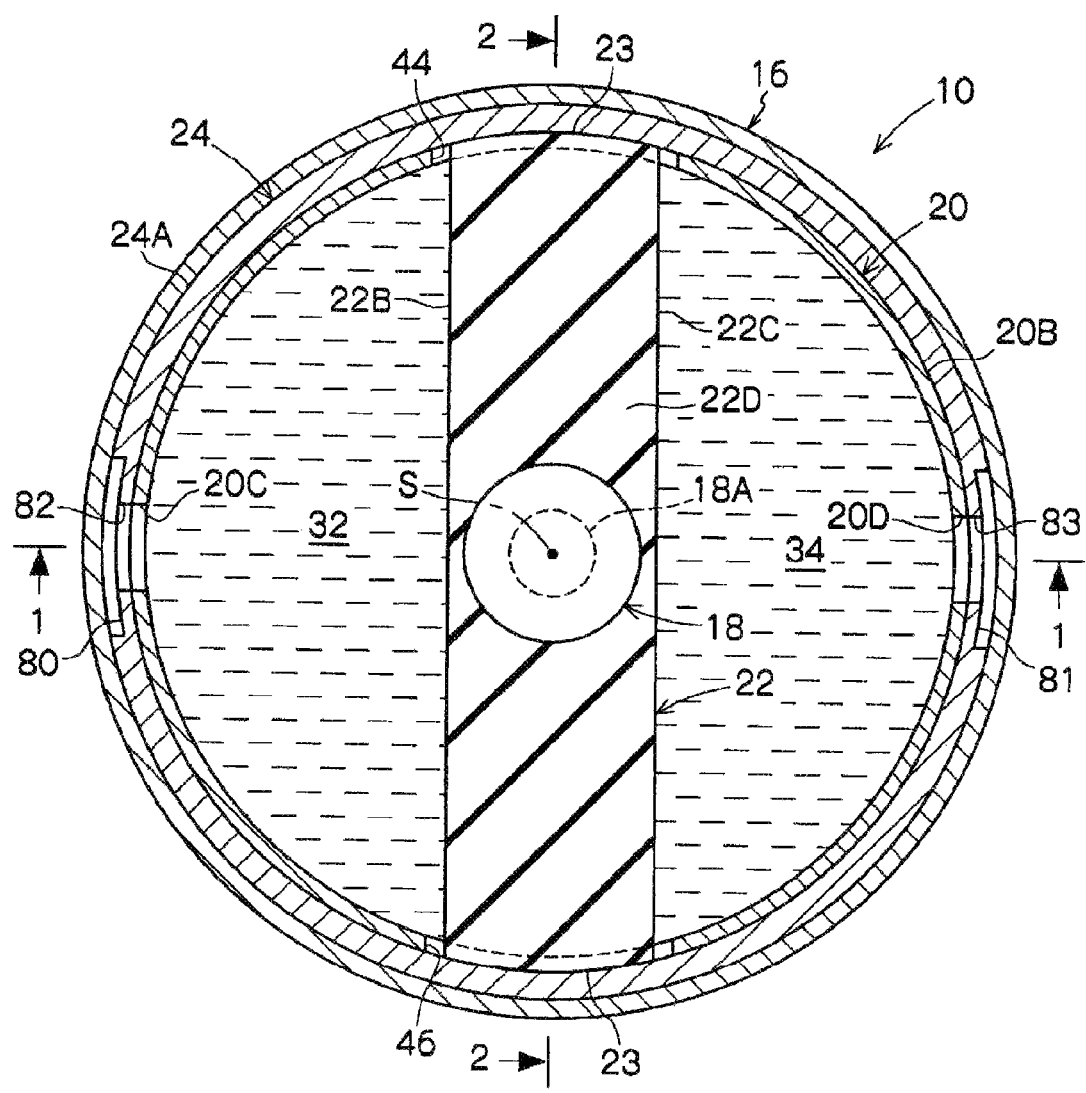
FIG. 3 is a cross-sectional view as seen in the direction of arrow 3-3 in FIG. 1, showing the vibration damper according to the first embodiment of the present invention, with the bracket removed.

The rubber elastic body 22 corresponding to the inner peripheral side of the small-diameter portion 20B of the intermediate cylinder portion has regions situated on left and right sides of the mounting member 18 in FIG. 1, which regions are formed with a first hollow cavity 22B and a second hollow cavity 22C, respectively. Each hollow cavity 22B, 22C is recessed from the outer peripheral surface radially inwards and has a depressed longitudinal-sectional shape along the axial direction, as well as a semi-circular cross-sectional shape along the radial direction, as shown in FIG. 3. The rubber elastic body 22 has a further region situated between the hollow cavities 22B, 22C, which region is provided with a partition wall portion 22D having a constant width from the inner peripheral side toward the outer peripheral side, and partitioning the hollow cavities 22B, 22C from each other.

Each hollow cavity 22B, 22C has an outer peripheral side that is closed by the inner peripheral surface of the intermediate cylinder member 20. Thus, internal spaces are formed within the first hollow cavity 22B and the second hollow cavity 22C, which are sealed from outside. The internal spaces within the first and second hollow cavities 22B, 22C in the regions of the rubber elastic body 22 on both sides of the mounting member 18 and the partition wall portion 22D define a pair of second pressure receiving liquid chambers 32, 34, which are filled with the liquid, such as ethylene glycol, silicone oil, etc. With reference to FIGS. 1 and 3, the second pressure receiving liquid chamber 32 on the left side corresponds to the first hollow cavity 22B, and the second pressure receiving liquid chamber 34 on the right side corresponds to the second hollow cavity 22C.

As shown in FIG. 2, the small-diameter portion 20B of the intermediate cylinder member 20 is formed with axially elongate, substantially rectangular, first and second openings 44, 46. These openings 44, 46 are arranged opposite to the both radially outer ends 23 of the partition wall portion 22D of the rubber elastic body 22, and extend radially through the intermediate cylinder member 20.

Figure 5:
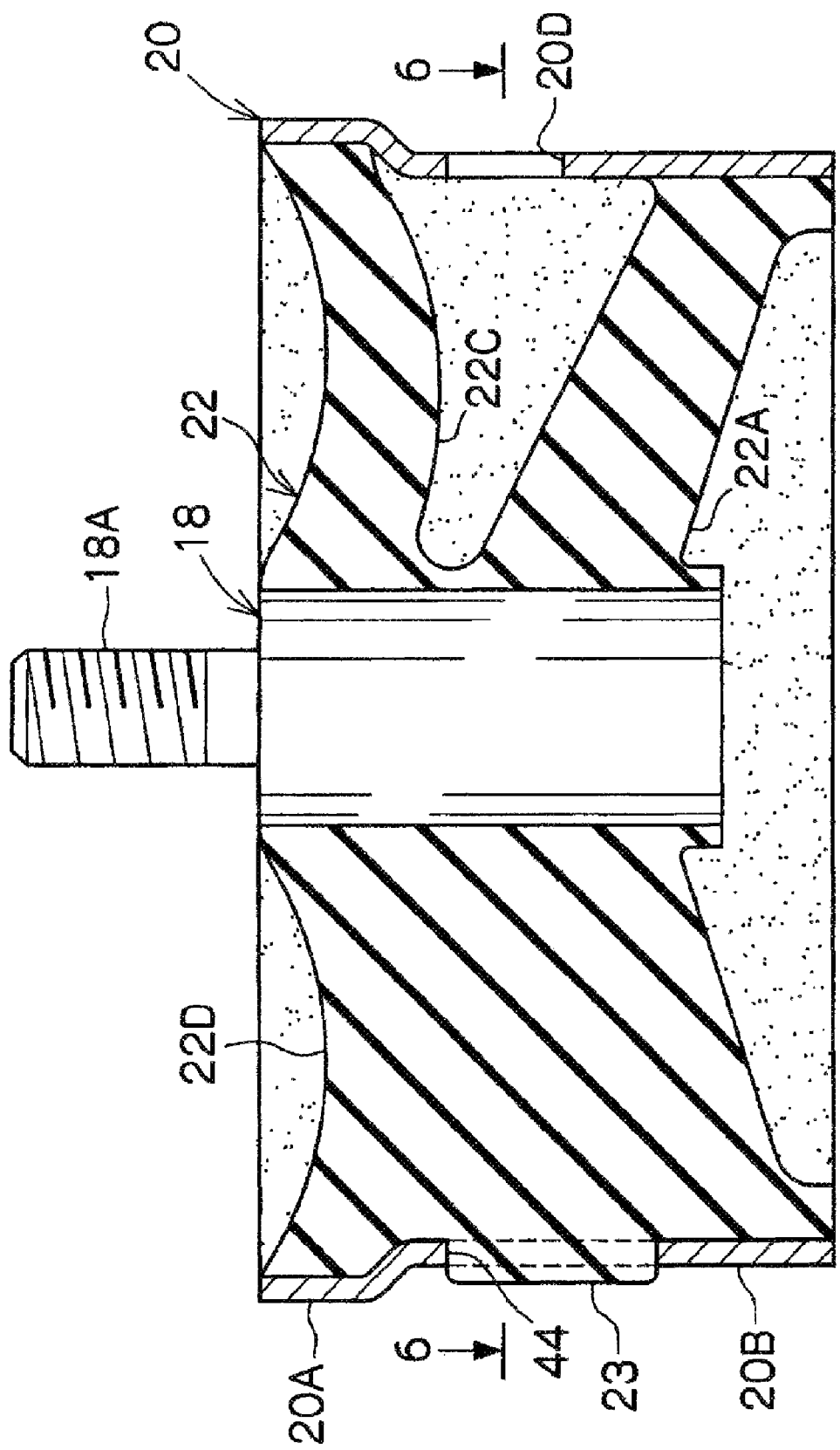
FIG. 5 is a longitudinal sectional view as seen in the direction of arrow 5-5 in FIG. 6, showing the integral formation of an intermediate cylinder member, a rubber elastic body and a fitting, which are used in the vibration damper according to the first embodiment of the present invention.
Figure 6:
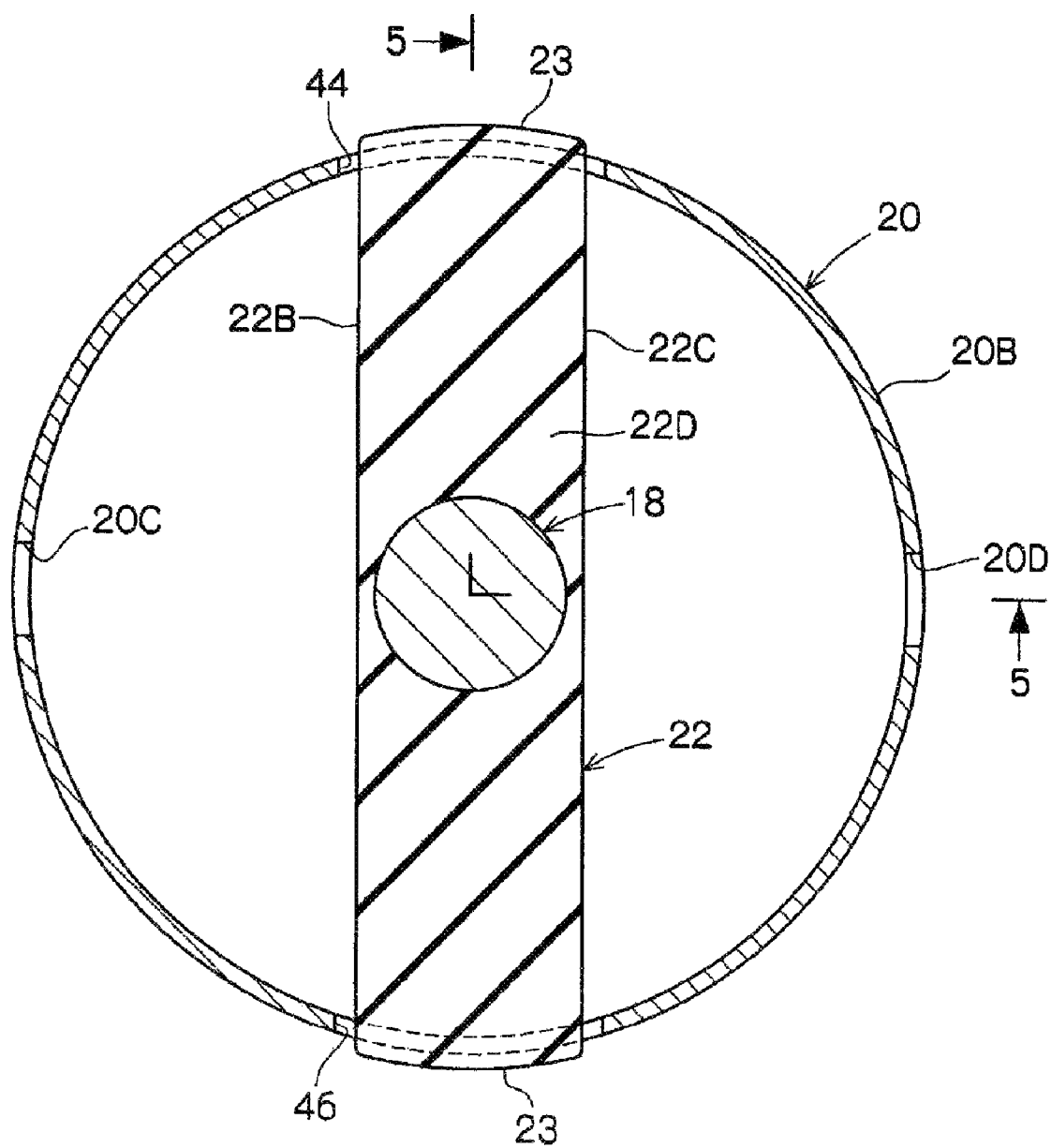
FIG. 6 is a longitudinal sectional view as seen in the direction of arrow 6-6 in FIG. 5, showing the integral formation of the intermediate cylinder member, the rubber elastic body and the fitting, which are used in the vibration damper according to the first embodiment of the present invention.

More particularly, the partition wall portion 22D is arranged in those regions of the rubber elastic body 22, which are opposed to the pair of the openings 44, 46 of the intermediate cylinder member 20. As shown in FIGS. 5 and 6, the partition wall portion 22D is fitted in the pair of the openings 44, 46 in the intermediate cylinder member 20, such that its outer ends 23 project from the pair of the openings 44, 46 toward the outer cylinder member 16 on the radially outer side. In this way, the pair of the second pressure receiving liquid chambers 32, 34 are partitioned by the partition wall portion 22D. The outer ends 23 of the partition wall portion 22D have junctions opposing to the outer cylinder member 16, which hare urged against the outer cylinder member 16 in a non-adhering manner, through a ring portion 24A of a partition member 24 to be described hereinafter.

On the other hand, a diaphragm 48 made of a thin film-like rubber is adhered by vulcanization to the inner peripheral surface of the small-diameter portion 16B on the lower side of the outer cylinder member 16, so as to close the lower end of the outer cylinder member 16. Therefore, a space is defined by the diaphragm 48 and the partition member 24, which is sealed from outside. This space forms an auxiliary liquid chamber 36, which is filled by the liquid, such as ethylene glycol, silicone oil, etc. The diaphragm 48 is elastically deformable in the axial direction, so as to increase or decrease the internal volume of the auxiliary liquid chamber 36 in response to change in the pressure of the liquid filling the auxiliary liquid chamber 36.

Figure 4:
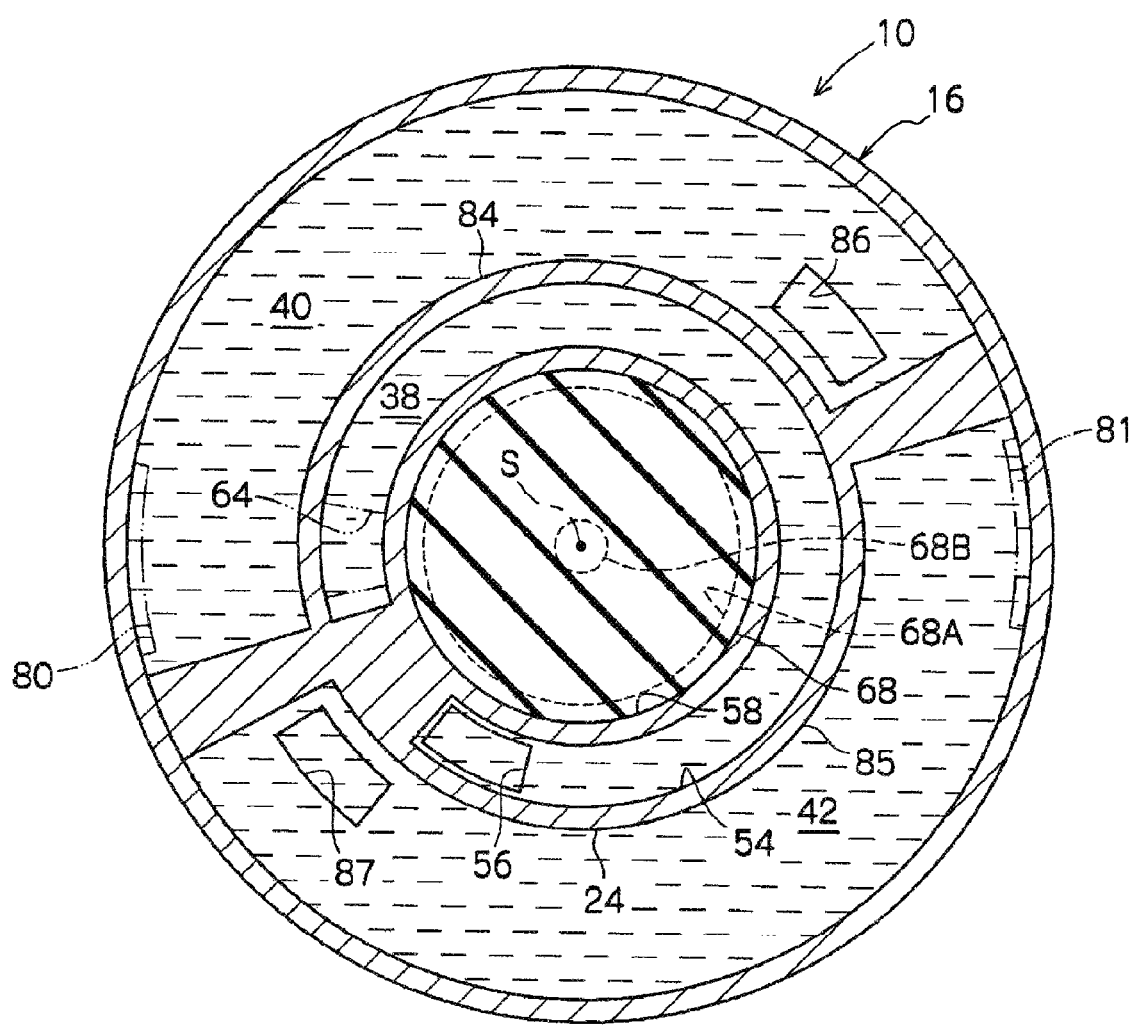
FIG. 4 is a cross-sectional view as seen in the direction of arrow 4-4 in FIG. 1, showing the vibration damper according to the first embodiment of the present invention, with the bracket removed.

As shown in FIG. 4, the upper surface portion of the partition member 24 is formed with an annular groove 54 that extends in the circumferential direction about the center axis S, over substantially one turn. The annular groove 54 has one end formed with a communication hole 56 that extends through the partition member 24 up to its lower surface. As shown in FIG. 1, furthermore, the annular groove 54 of the partition member 24 has a radially inner region, which is formed with a circular recess 58. The recess 58 has a bottom portion, which is formed with a plurality of openings 60 extending through the partition member 24 up to its lower surface.

A disc-like closure plate 62 closing the upper surface portion of the recesses 58 is fixedly secured to the partition member 24, by adhesion, thread connection, mechanical deformation, etc. The closure plate 62 has a region corresponding to the other end of the annular groove 54, which region is formed with a communication hole 64, and a region opposite to the recess 58, which region is formed with a plurality of openings 65.

Here, the communication hole 56 and the annular groove 54 in the partition member 24, and the communication hole 64 in the closure plate 62 constitute a first orifice 38 as a restriction passage for communicating the first pressure receiving liquid chamber 30 and the auxiliary liquid chamber 36 with each other. Thus, the first pressure receiving liquid chamber 30 and the auxiliary liquid chamber 36 are communicated with each other through the first orifice 38 so as to allow flow of the liquid between the first pressure receiving liquid chamber 30 and the auxiliary liquid chamber 36.

Further, the recess 58 in the partition member 24 having its upper surface side closed by the closure plate 62 is formed as an accommodation space 70 for accommodating a movable plate 68 in the form of a rubber membrane. The movable plate 68 is in the form of a disc having a substantially constant thickness, and is provided on its outer peripheral region with an annular, outer peripheral guide portion 68A that projects vertically upwards and downwards, and further provided in its center region with a center guide portion 68B that also projects vertically upwards and downwards.

The outer peripheral guide portion 68A and the center guide portion 68B have a height that is slightly larger than the height of the accommodation space 70 as measured in the axial direction. Thus, when the closure plate 62 is mounted in place, the guide portions 68A, 68B are subjected to precompression. Incidentally, the movable plate 68 has an outer diameter that is substantially same as the inner diameter of the accommodation space 70.

With the above-described structure, the movable plate 68 can be moved or vibrated within a range corresponding to the difference between the thickness of the movable plate 68 in regions except the outer peripheral guide portion 68A and the center guide portion 68B, and the height of the accommodation space 70. However, due to the provision of the center guide portion 68B at the center region of the movable plate 68, a large vibration at the center region is suppressed. Therefore, it is possible to suppress a large deformation of the movable plate 68 due to a sudden fluctuation of the liquid pressure, and suppress occurrence of abnormal noise or striking noise due to the contact of the movable plate 68 with the bottom portion of the recess 58 or the closure plate 62.

As a vertical vibration (main vibration) generated by a vehicle engine as the vibration source, there is known a shaking vibration having a relatively low frequency (e.g., 8 to 15 Hz). he shaking vibration can be further classified into an engine bouncing vibration ("bouncing vibration") having a frequency of less than 10 Hz, and a pitching vibration having a frequency of 10 to 15 Hz. In the vibration damper 10 according to the illustrated embodiment, the first orifice for communicating the first pressure receiving liquid chamber 30 and the auxiliary liquid chamber 36 has a length and a cross-sectional area, which are tuned to correspond to the frequency of the bouncing vibration (i.e., less than 10 Hz).

As shown in FIGS. 1 to 3, the ring portion 24A provided for the disc-like partition member 24 has an outer diameter that corresponds to the inner diameter of the outer cylinder member 16, and projects upwards from the outer peripheral region of the partition member 24 in a cylindrical manner. Thus, the ring portion 24A inserted into the outer cylinder member 16 has an outer peripheral surface that is in pressure contact with the inner peripheral surface of the outer cylinder member 16. Furthermore, the ring portion 24 has an inner diameter that corresponds to the outer diameter of the intermediate cylinder member 20 in its small-diameter portion 20B, so that the inner peripheral surface of the rig portion 24A is in abutment with the outer peripheral surface of the small-diameter portion 20B. Both ends 23 of the partition wall portion 2D projecting from the pair of the openings 44, 46 in the intermediate cylinder member 20 are urged against the ring portion 24A so as to be substantially flush with the outer peripheral surface of the small-diameter portion 20B.

On the other hand, as shown in FIG. 1, vertically extending outer peripheral grooves 80, 81 are formed in the outer peripheral surface of the ring portion 24A, at symmetrical positions on both sides of the mounting member 18. These outer peripheral grooves 80, 81 are communicated, respectively, with the disc-like portion as the main body portion of the partition member 24.

The ring portion 24A is provided with an upper communication port 82 that extends from one end of the outer peripheral groove 80 to the inner peripheral surface of the ring portion 24A. A through hole 20C is formed in the corresponding portion of the intermediate cylinder member 20. As shown in FIG. 4, the other end of the outer peripheral groove 80 is in communication with one end of a groove 84 that is formed in the main body portion of the partition member to extend over substantially a half circumference. The other end of the groove 84 is provided with a lower communication port 86 that extends toward the auxiliary liquid chamber 36 on the lower side.

Similarly, the ring portion 24A is provided with an upper communication port 83 that extends from one end of the outer peripheral groove 81 to the inner peripheral surface of the ring portion 24A. A through hole 20D is formed in the corresponding portion of the intermediate cylinder member 20. As shown in FIG. 4, the other end of the outer peripheral groove 81 is in communication with one end of a groove 85 that is formed in the main body portion of the partition member to extend over substantially a half circumference. The other end of the groove 85 is provided with a lower communication port 87 that extends toward the auxiliary liquid chamber 36 on the lower side.

Here, the outer peripheral grooves 80, 81 of the ring portion 24A are closed on their outer peripheral sides by the inner peripheral surface of the outer cylinder member 16. The outer peripheral groove 80 having the closed outer peripheral side and the groove 84 constitute a second orifice 40 for communicating the auxiliary liquid chamber 36 and the second pressure receiving liquid chamber 32 on the left side. Similarly, the outer peripheral groove 81 having the closed outer peripheral side and the groove 85 constitute a second orifice 42 for communicating the auxiliary liquid chamber 36 and the second pressure receiving liquid chamber 34 on the right side. Thus, the second orifices 40, 42 allows communication of the liquid between the pair of the second pressure receiving liquid chambers 32, 34 and the auxiliary liquid chamber 36.

In the vibration damper according to the illustrated embodiment, each of the second orifices 40, 42 forming the pair has a length and a cross-sectional area, which are tuned to correspond to the frequency of the pitching vibration (i.e., 10 to 15 Hz), in relation to the vibration in the main amplitude direction, and to a specific frequency selected from the frequency range of 5 Hz to 20 Hz, in relation to the vibration in the auxiliary amplitude direction.

In the illustrated embodiment, when the vibration is applied to the rubber elastic body 22 through the mounting member 18, the rubber elastic body 22 is elastically deformed in the left and right direction in FIG. 1 in which the second pressure receiving liquid chamber 32 on the left side and the second pressure receiving liquid chamber 34 on the right side are arranged. By this, the internal volume of the second pressure receiving liquid chamber 32 on the left side, and the internal volume of the second pressure receiving liquid chamber 34 on the right side, are each increased or decreased.

Here, the internal volume of the second pressure receiving liquid chamber 32 on the left side, and the internal volume of the second pressure receiving liquid chamber 34 on the right side, are each adjusted so as to provide a rigidity with respect to the input load directed toward the second pressure receiving liquid chamber 32 on the left side, and a rigidity with respect to the input load directed toward the second pressure receiving liquid chamber 34 on the right side, which rigidities are substantially the same with each other. The vibration damper according to the illustrated embodiment, when mounted on a vehicle, is adjusted such that the changing direction of the internal volumes of the second pressure receiving liquid chamber substantially coincides with the auxiliary amplitude direction to be described hereinafter.

In order to assemble the vibration damper according to the illustrated embodiment, the mounting member 18 and the intermediate cylinder member 20, which are connected to each other by the partition member 24 and the rubber elastic member 22, are inserted to a predetermined location within the outer cylinder member 16, and the outer cylinder member 16 as a whole is then mechanically deformed radially outward so that the partition member 24 and the intermediate cylinder member 20 are fixed with respect to the outer cylinder member 16. Subsequently, the outer cylinder member 16 is inserted into the holder portion 12A of the bracket 12, and fixed by a mechanical deformation in the manner described above.

The operation of the vibration damper 10 according to the illustrated embodiment having the above-mentioned structure will be explained below. In the illustrated embodiment, when the engine is operated, to which the mounting member 18 is connected, the vibration from the engine is transmitted through the mounting member 18 to the rubber elastic body 22, which is arranged between the mounting member 18 and the intermediate cylinder member 20 which, in turn, is fitted into the inner peripheral surface of the outer cylinder member 16. On this occasion, the rubber elastic body 22 acts as a vibration absorbing main body such that the rubber elastic body 22 undergoes an elastic deformation to absorb the vibration by a damping function due to the internal friction of the rubber elastic body 22, etc., so as to mitigate the vibration transmitted to the vehicle body side.

In this instance, the major vibrations applied from the engine to the vibration damper 10 include a vibration (main vibration) generated by the reciprocating movement of the pistons in the piston cylinders within the engine, and a vibration (auxiliary vibration) generated by a change in the rotational speed of the crankshaft within the engine. In the case of a series type engine, the main vibration has an amplitude direction (main amplitude direction), which substantially coincides with the vertical direction of the vehicle, and the auxiliary vibration has an amplitude direction (auxiliary amplitude direction) which substantially coincides with the fore-and-aft direction of the vehicle (for a transverse arrangement of the engine), or with the left-and-right direction of the vehicle (for a longitudinal arrangement of the engine).

The above-mentioned vibration damper 10 serves to absorb part of the vibration whether the vibration is the main vibration in the main amplitude direction substantially coincident with the axial direction of the vibration damper 10, or the auxiliary vibration in the auxiliary amplitude direction intersecting at right angles to the main amplitude direction.

The first pressure receiving liquid chamber 30 arranged on the radially inside of the intermediate cylinder member 20 in opposition to the lower end portion of the mounting member 18 is communicated, through the first orifice 38, with the auxiliary liquid chamber 36 of which the partition wall is partly deformable. By this, when a vibration is applied in the main amplitude direction, from the engine side to the mounting member 18, the rubber elastic body 22 undergoes an elastic deformation in the main amplitude direction to increase or decrease the internal volume of the first pressure receiving liquid chamber 30. As a result, the liquid is allowed to flow between the first pressure receiving liquid chamber 30 and the auxiliary liquid chamber 36 having an internal volume that increases or decreases in response to the change in the liquid pressure.

In this instance, since the length and the cross-sectional area of the first orifice 38 are tuned to correspond to the frequency of the bouncing vibration, when the input vibration is the bouncing vibration, there occurs a resonance phenomena (liquid column resonance) to the liquid flowing synchronously with the input vibration. Therefore, the bouncing vibration applied in the main amplitude direction can be effectively absorbed by the pressure change and the viscosity resistance of the liquid as a result of the liquid column resonance.

Furthermore, when the input vibration is higher in frequency and smaller in amplitude than the shaking vibration, for example, when the input vibration is an idling vibration (i.e., the frequency of 20 to 30 Hz) and its amplitude is approximately 0.1 mm to 0.2 mm, the first orifice 38 tuned to correspond to the shaking vibration is clogged, making it difficult for the liquid to flow through the first orifice 38.

However, since the movable plate 68 vibrates in the axial direction within the accommodation space 70, the liquid is allowed to flow through a clearance between the inner wall surface of the accommodation space 70 and the movable plate 68, and also through the openings 60, 65. As a result, it is possible to suppress an increase in the dynamic spring constant due to the increase in the liquid pressure within the first pressure receiving liquid chamber 30. In this way, even upon application of a high frequency vibration, the dynamic spring constant of the rubber elastic body 22 can be maintained at a low level so as to effectively absorb the high frequency vibration by the elastic deformation of the rubber elastic body 22, etc.

On the other hand, when a vibration in the auxiliary amplitude direction is applied from the engine side to the mounting member 18 and the rubber elastic body 22 thus undergoes an elastic deformation in the auxiliary amplitude direction, the internal volume of each of the second pressure receiving liquid chambers 32, 34 forming the pair increases or decreases alternately. As a result, since the pair of the second pressure receiving liquid chambers 32, 34 are communicated with the auxiliary liquid chamber 36 through the pair of the second orifices 40, 42, respectively, the liquid is allowed to alternately flow between the pair of the second pressure receiving liquid chambers 32, 34 and the auxiliary liquid chamber 36, synchronously with the input vibration.

Here, the pair of the second orifices 40, 42 are each designed to have a length and a cross-sectional area, which are tuned to correspond to a specific frequency selected from the range of 5 Hz to 20 Hz, in the case of a vibration in the auxiliary amplitude direction. Therefore, when the input auxiliary vibration has the specific frequency, there occurs a resonance phenomena to the liquid flowing between the second pressure receiving liquid chambers 32, 34 and the auxiliary liquid chamber 36 through the pair of the second orifices 40, 42, respectively. As a result, the input vibration applied in the auxiliary amplitude direction and having the specific frequency can be effectively absorbed by the pressure change and the viscosity resistance of the liquid as a result of the liquid column resonance.

On the other hand, in the illustrated embodiment, as shown in FIGS. 2 and 3, the intermediate cylinder member 20 is provided with the openings 44, 46 in pair, which extend radially through the intermediate cylinder member 20, and the rubber elastic body 22 is provided, in its regions corresponding to the pair of the openings 44, 46, with a partition wall portion 22D for defining the pair of the second pressure receiving liquid chambers 32, 34. Furthermore, both ends 23 of the partition wall portion 22D of the rubber elastic body 22 are fitted into the pair of the openings 44, 46, respectively, so as to project from these openings 44, 46 toward the outer cylinder member 16.

Therefore, the partition wall portion 22D partitioning the pair of the second pressure receiving liquid chambers 32, 34 has a structure in which it is not adhered to the intermediate cylinder member 20. As a result, even when a large input vibration is applied from the engine side to the vibration damper 10, which causes a large deformation of the partition wall portion 22D of the rubber elastic body 22, sine the partition wall portion 22D is not adhered to the intermediate cylinder member 20, the partition wall portion 22D is allowed to deform freely to prevent fatigue of the partition wall portion 22D and thereby provide an improved durability of the vibration damper 10.

Furthermore, because the partition wall portion 22D of the rubber elastic body 22 fitted into the pair of the openings 44, 46 has both ends 23, which project toward the outer cylinder member 16 and are urged against the ring portion 24A of the partition member 24 arranged between the outer cylinder member 16, a sealing function is achieved to positively prevent leakage of the liquid within the pair of the second pressure receiving liquid chambers 32, 34.

In other words, because the both ends 23 of the partition wall portion 22D of the rubber elastic body 22 are fitted into the pair of the openings 44, 46 in the intermediate cylinder member 20, it is possible positively to eliminate adhesion of the partition wall portion 22D to the intermediate cylinder member 20, thereby allowing the partition wall portion 22D to freely deform and achieve a stress relaxation, while positively preventing leakage of the liquid within the pair of the second pressure receiving liquid chambers 32, 34.

According to the present embodiment, the first pressure receiving liquid chamber 30 and the pair of the second pressure receiving liquid chambers 32, 34 are arranged within a narrow space of the vibration damper in an optimum manner, such that the first pressure receiving liquid chamber 30 is arranged opposite to the lower end of the mounting member 18 and the pair of the second pressure receiving liquid chambers 32, 34 are arranged at symmetrical positions on both sides of the mounting member 18, thereby allowing realization of a small-sized vibration damper with an improved durability.

According to the present embodiment, furthermore, although the second pressure receiving liquid chambers 32, 34 of the pair are arranged between the intermediate cylinder member 20 and the mounting member 18, even when a vibration is applied in the main amplitude direction, the pair of the second pressure receiving liquid chambers 32, 34 are deformed as a result of the elastic deformation of the rubber elastic body 22, thereby causing the internal volumes of the second pressure receiving liquid chambers 32, 34 to be increased or decreased. On this occasion, although the amount of change in the internal volume of the pair of the second pressure receiving liquid chambers 32, 34 is relatively small as compared to the amount of change in the internal volume of the first pressure receiving liquid chamber 30, there still occurs a change in the internal volume in the pair of the second pressure receiving liquid chambers 32, 34, by an amount corresponding to the deformation amount of the rubber elastic body 22.

Therefore, even when a main vibration is applied in the main amplitude direction, from the engine side to the mounting member 18, the rubber elastic body 22 undergoes an elastic deformation in the main amplitude direction, thereby causing the internal volumes of the second pressure receiving liquid chambers 32, 34 to be increased or decreased. As a result, there occurs a phenomena wherein the liquid flows between the pair of the second pressure receiving liquid chambers 32, 34 and the auxiliary liquid chamber 36, through the pair of the orifices 40, 42, respectively.

On this occasion, since the pair of the second orifices 40, 42 are each designed to have a length and a cross-sectional area, which are each tuned to correspond to the frequency of the pitching vibration in the case of an input vibration in the main amplitude direction, when an input auxiliary vibration has a frequency of the pitching vibration, there occurs a resonance phenomena to the liquid flowing between the pair of the second pressure receiving liquid chambers 32, 34 and the auxiliary liquid chamber 36, through the pair of the orifices 40, 42, respectively. As a result, the pitching vibration applied in the main amplitude direction can be effectively absorbed by the pressure change and the viscosity resistance of the liquid as a result of the resonance phenomena of the liquid.

Incidentally, although the vibration damper according to the present embodiment has been explained in connection with an arrangement wherein the outer cylinder member 16 is connected to the vehicle body side through the bracket 12, and the mounting member 18 is connected to the engine side, the arrangement may be reversed. Thus, the outer cylinder member 16 may be connected to the engine side with the mounting member 18 connected to the vehicle body side.

Furthermore, the present embodiment has been described for the purpose of vibration damping for a vehicle body, the vibration damper according to the present invention may be used for various applications other than vehicles. Of course, the outer cylinder member 16, the mounting member 18 and the rubber elastic body 22 are not limited in shape or dimension to those of the specific embodiment.

Figure 7:
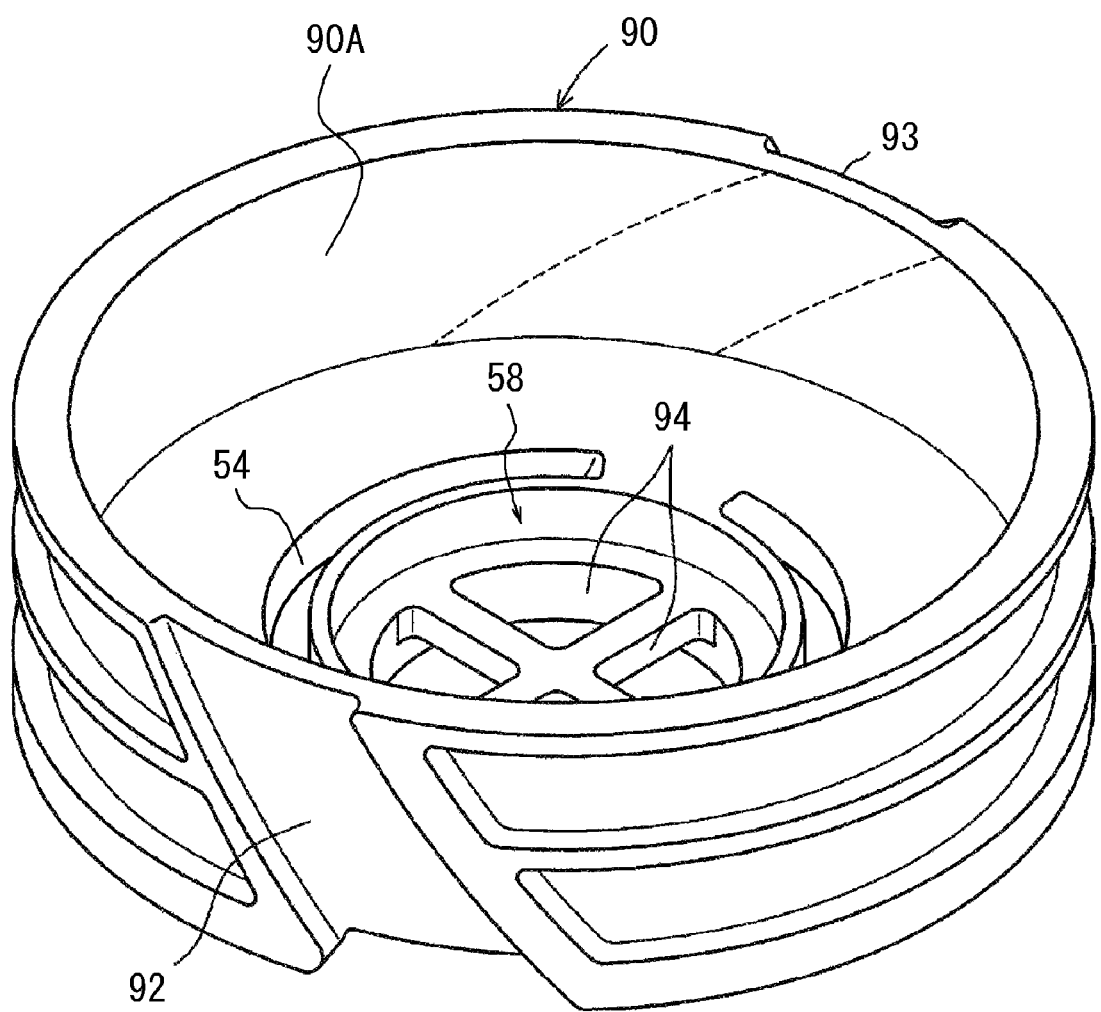
FIG. 7 is a perspective view showing a partition member as used in a second embodiment of the present invention.
Figure 8:
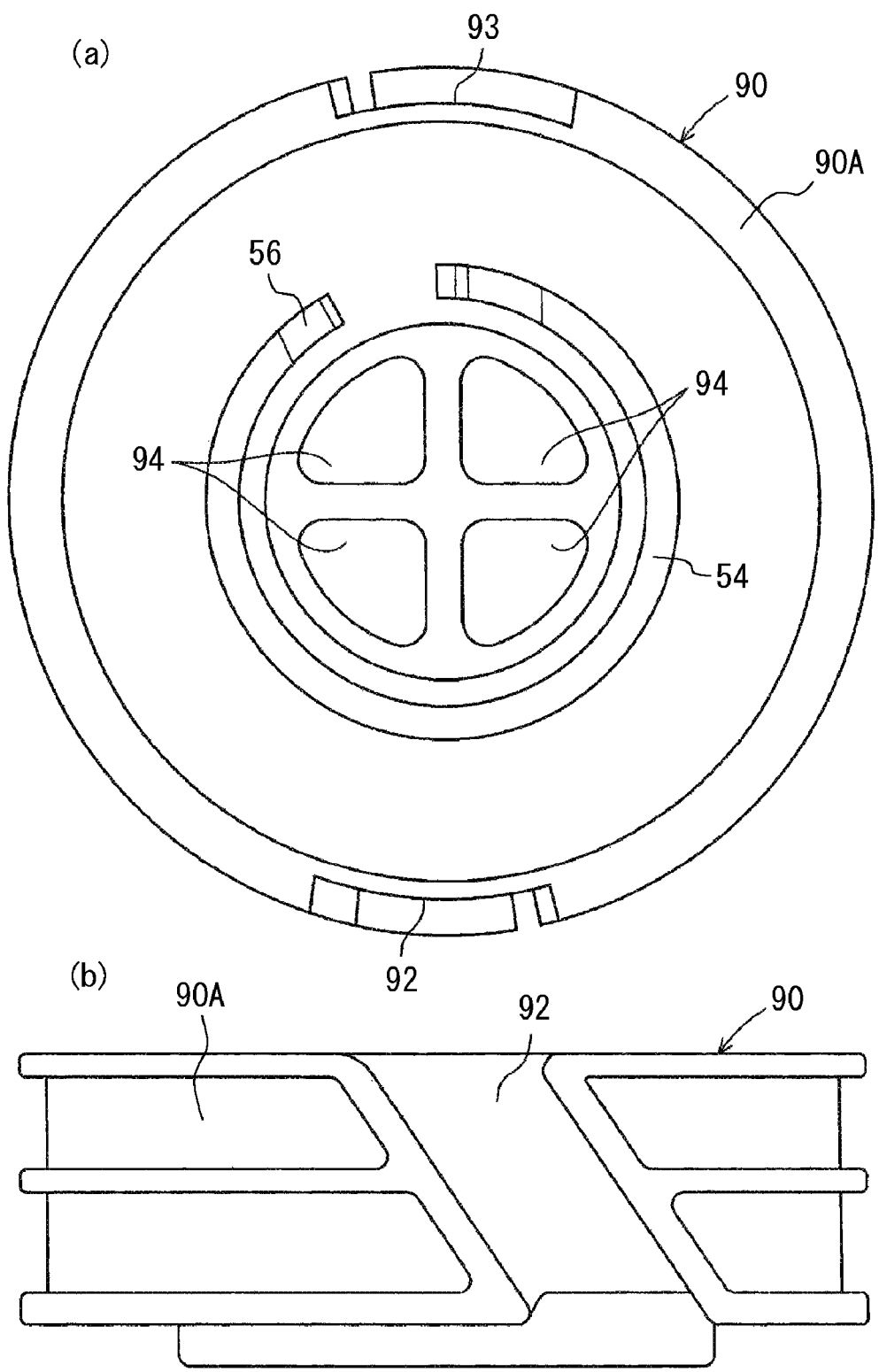
FIGS. 8(a) and 8(b) are a plan view and a front view, respectively, of the partition member in the second embodiment of the present invention.

The vibration damper according to a second embodiment of the present invention will be described below. The second embodiment is featured by a modified partition member which is shown in FIG. 7 and FIGS. 8(a) and 8(b). The partition member is represented by reference numeral 90, and includes a ring portion 90A having an outer peripheral surface which is provided, instead of the outer peripheral grooves 80, 81 in the previous embodiment, with a first groove portion 92 and a second groove portion 93, wherein the groove portions 92, 93 are larger in width than the outer peripheral grooves 80, 81. The groove portions 92, 93 are opposed to each other in the diametrical direction. In the present embodiment, these groove portions 92, 93 cooperate with the outer cylinder member 16 to define the respective orifices as the passage for the liquid. Among these groove portions 92, 93, the first groove portion 92 has an upper end that is opened into the second pressure receiving liquid chamber 32 on the left side, and a lower end that is opened directly into the auxiliary liquid chamber 36 without intervention of other specific grooves. Similarly, the second groove portion 93 has an upper end that is opened into the second pressure receiving liquid chamber 34 on the right side, and a lower end that is opened directly into the auxiliary liquid chamber 36.

Here, the first and the second groove portions 92, 93 may be arranged so as to extend obliquely an at inclination angle of not less than 45° relative to the center axis of the partition member 90, or to extend in the direction of the center axis.

Also, the orifices defined by the first and the second groove portions 92, 93 and the outer cylinder member 16 are each tuned to correspond to the frequency (approximately 20 to 30 Hz) of the idling vibration, which is higher than the frequency of the shaking vibration.

In the second embodiment, furthermore, as particularly shown in FIG. 7, the partition member 90 as a whole is substantially cup-shaped, and is provided with a circular recess 58 as in the previous embodiment, at a center region of the bottom surface. The recess 58 has a bottom that is provided, instead of the above-described plurality of openings 60, with a plurality of sector-shaped through holes 94. A substantially annular groove portion 54 is formed around these through holes 94 in the manner described above, wherein the groove portion 54 has one end provided with a communication hole 56 for communicating the groove portion 54 with the auxiliary liquid chamber 36.

A closure plate 62 is fixedly arranged on the bottom surface of the partition member 90, as in the previous embodiment. The first orifice 38 for communicating the first pressure receiving liquid chamber 30 and the auxiliary liquid chamber 36 with each other is defined by the communication hole 64 in the closure plate 62, and the groove portion 54 and the communication hole 56 in the partition member 90.

In this instance, the recess 58 in the partition member 90 having an upper surface side closed by the closure plate 62, in which the plurality of the openings 65 are formed in addition to the communication hole 64 functions as the accommodation space 70 for accommodating the movable plate 68 as in the previous embodiment. Although the movable plate 68 may have a substantially constant thickness, without formation of the outer peripheral and center guide portions 68A, 68B, the movable plate 68 can be vibrated in the axial direction, within a range corresponding to the thickness of the movable plate 68 and the height of the accommodation space 70.

The operation of the vibration damper 10 constructed as above is distinguished from that of the previous embodiment, wherein the first orifice 38 for communicating the first pressure receiving liquid chamber 30 and the auxiliary liquid chamber 36 with each other serves to absorb the bouncing vibration of less than 10 Hz included in the shaking vibration, and the pair of the second orifices 40, 42 for communicating the pair of the second pressure receiving liquid chambers 32, 34 and the auxiliary liquid chamber 36 with each other, respectively, serve to absorb the pitching vibration of 10 to 15 Hz, which is also included in the shaking vibration. Thus, in the second embodiment, the pair of the orifices defined by the first and second groove portions 92, 93 for communicating the respective second pressure receiving liquid chambers 32, 34 and the auxiliary liquid chamber 36 with each other serve to absorb the idling vibration of approximately 20 to 30 Hz so as to effectively isolate and absorb the vibration of a higher frequency, whether it is applied in the main amplitude direction or in the auxiliary amplitude direction.

Figure 9:
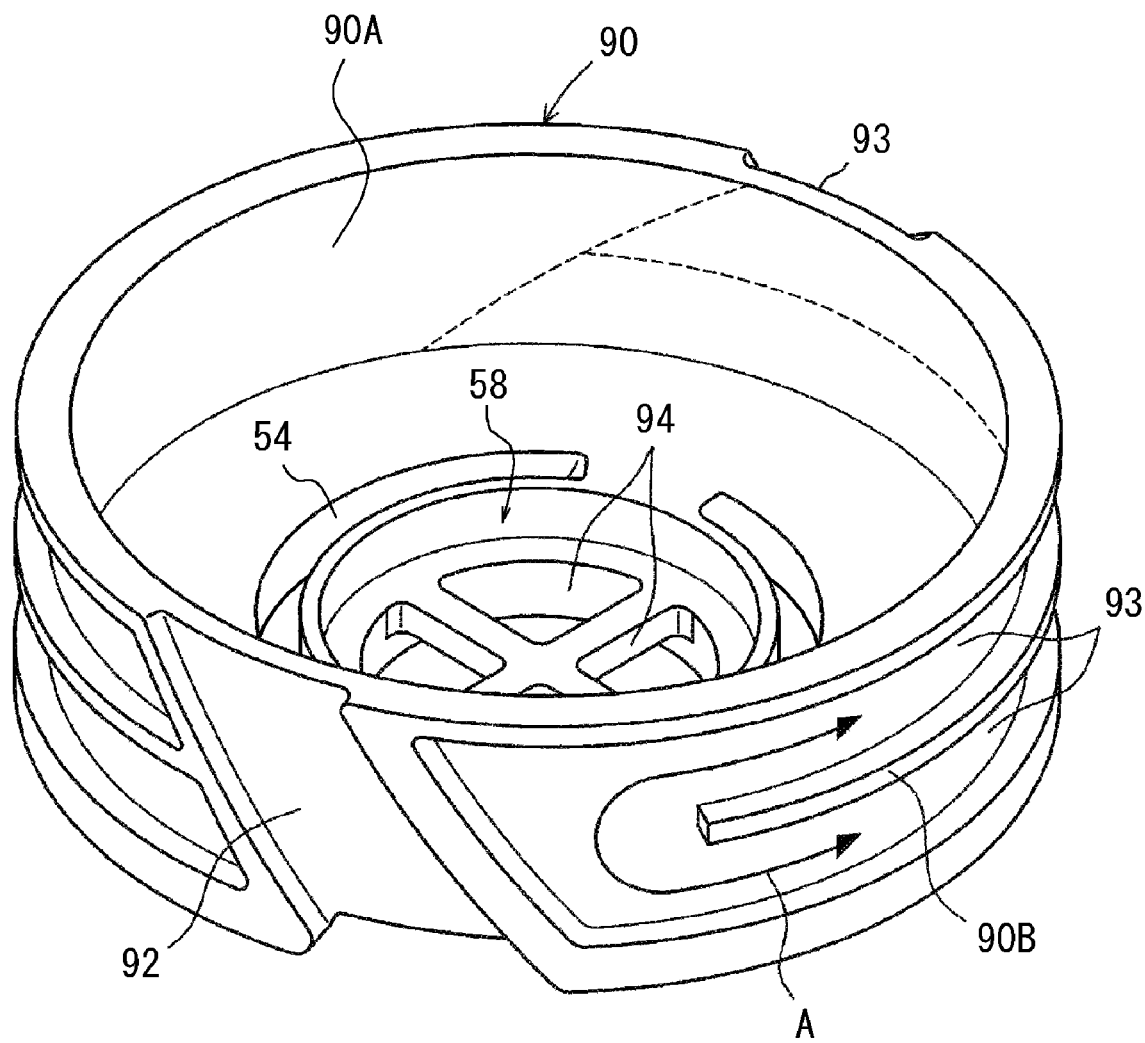
FIG. 9 is a perspective view showing a partition member as used in a further embodiment of the present invention.
Figure 10:
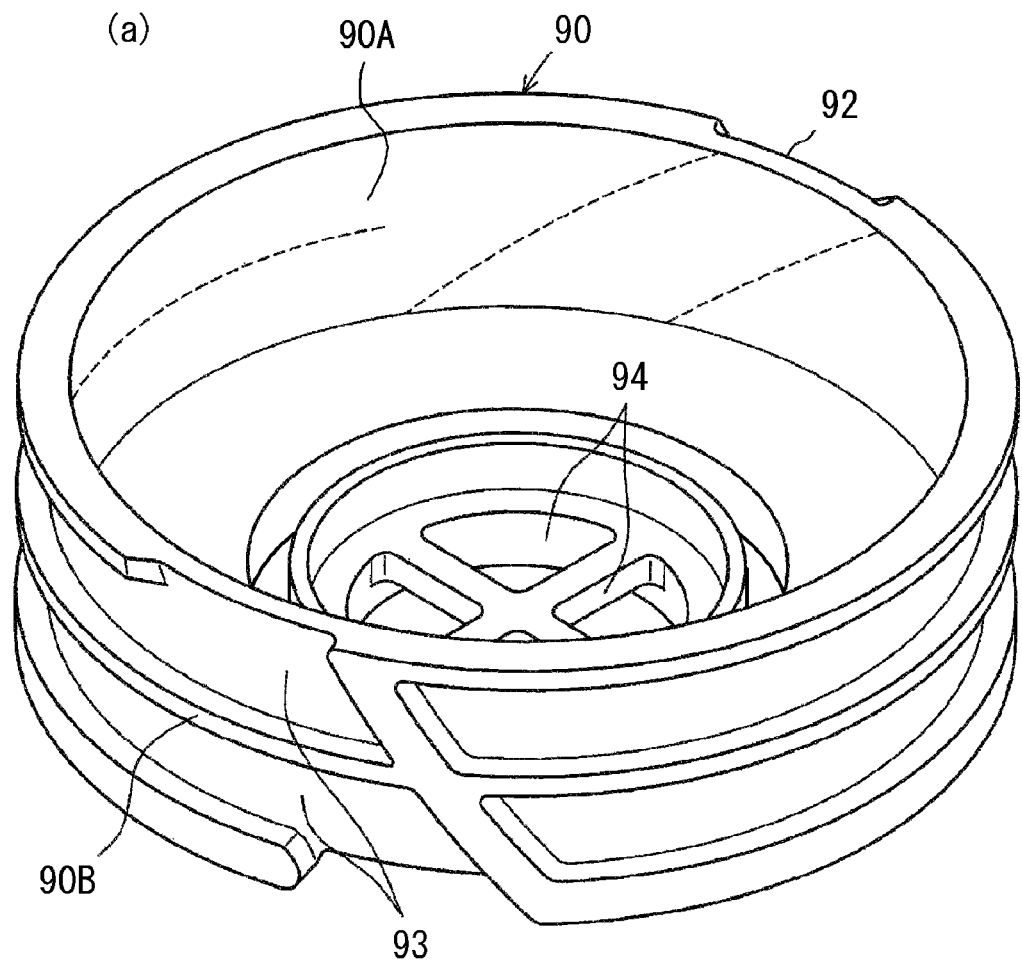
FIGS. 10(a) and 10(b) are a plan view and a front view, respectively, of the partition member in a still further embodiment of the present invention.
Figure 10:
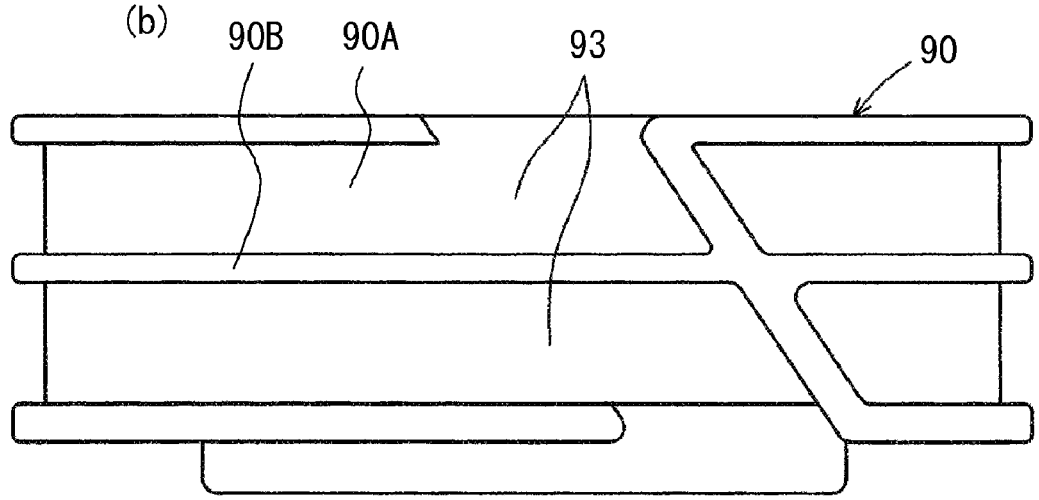

A third embodiment of the present invention is shown in FIG. 9 and FIGS. 10(a) and 10(b), wherein the partition member is subjected to a further modification. In the third embodiment, the first groove portion 92 extends obliquely at an inclination angle of not less than approximately 45° relative to the center axis, as in the second embodiment shown in FIG. 7 and FIGS. 8(a) and 8(b). However, the second groove portion 93 is formed as a reciprocating groove portion extending in the outer peripheral surface of the partition member 90 over substantially a half circumference, along a rib 90B extending substantially in the circumferential direction of the outer peripheral surface of the partition member 90. The orifice formed by the first groove portion is tuned to correspond to the frequency of the idling vibration, and the second groove portion 93 is tuned to correspond to the frequency of the shaking vibration.

Thus, in the third embodiment, the rib 90B is notched and removed in its region adjacent to the first groove portion 92, while the second groove portion 93 is U-turned at the notched region so as to extend back over a half circumference of the partition member 90, such that the second groove portion 93 has a total length close to the entire circumferential length of the partition member 90. By this, the orifice formed by the first groove portion 92 for communicating the second pressure receiving liquid chamber 32 on the left side and the auxiliary liquid chamber 36 with each other, is made significantly different in the flow resistance, from the orifice formed by the second groove portion 93 for communicating the second pressure receiving liquid chamber 34 on the right side and the auxiliary liquid chamber 36 with each other. The length and the cross-sectional area of these orifices are suitable determined so that the first groove portion 92 serves to absorb the idling vibration and the second groove portion 93 serves to absorb the shaking vibration.

When the groove portions 92, 93 and, hence, the respective orifices are tuned independently of the other, it is possible to sufficiently damp both the idling vibration and shaking vibration, and effectively absorb vibration over a wide frequency range.

(Comparative Test)

There have been prepared test vibration dampers including Example Devices 1 and 2 using the partition member 90 shown in FIG. 7 and FIGS. 8(a) and 8(b), wherein the orifices formed by the first and second groove portions 92, 93 are each tuned to low-amplitude, high-frequency vibration with a frequency (20 to 30 Hz) of the idling vibration, and a similarly designed Conventional Device. For these test devices, the elastic coefficient of the vibration damper with respect to the input vibration having a vertical amplitude of ±0.1 mm, and the damping characteristics with respect to the input vibration having a vertical amplitude of +0.5 mm have been measured. As a result, characteristic curves in response to the frequency of the input vibration as shown in FIGS. 11(a) and 11(b) have been obtained.

Figure 11:
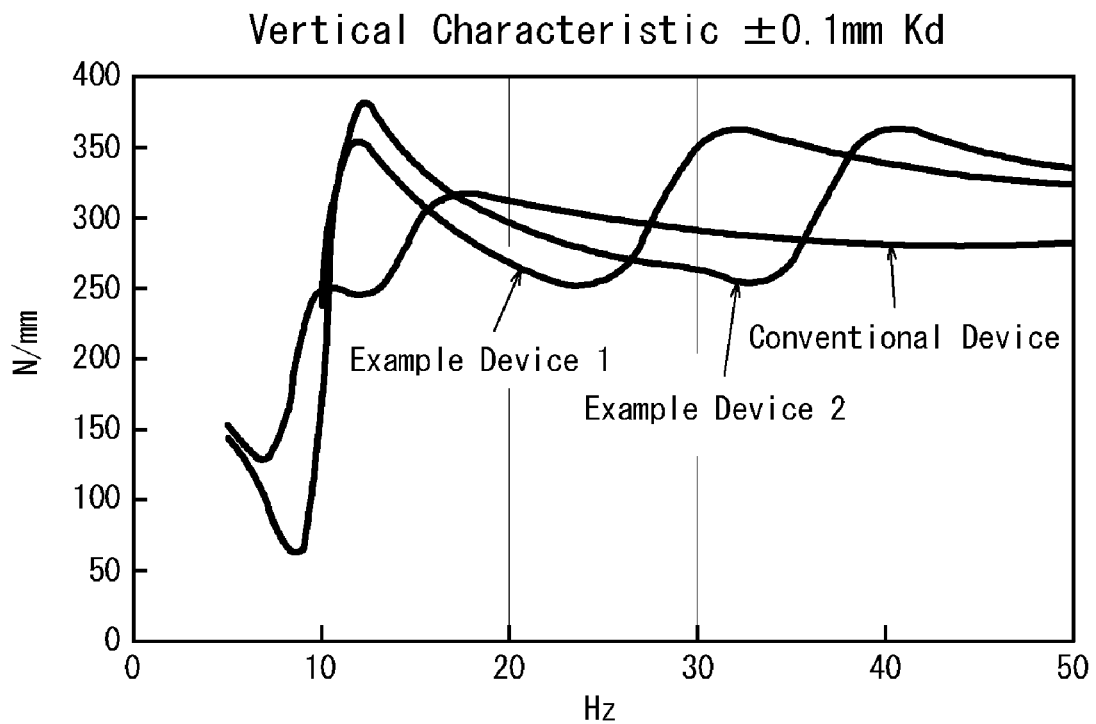
FIGS. 11(a) and 11(b) are graphs showing the performance of vibration dampers subjected to a comparative test.

It can be seen from FIG. 11(a) that Example Device 1 having the orifice cross-sectional area of 55 mm$^2$ and the orifice length of 60 mm, and Example Device 2 having the orifice cross-sectional area of 55 mm$^2$ and the orifice length of 40 mm, as compared to Conventional Device having the orifice cross-sectional area of 55 mm$^2$ and the orifice length of 90 mm, both provide an excellent vibration isolation function with respect to the vibration of 20 to 30 Hz, under a relatively low elastic coefficient. It can be further seen from FIG. 11(b) that Example Devices 1 and 2 both provide an excellent vibration damping function in the frequency range of 20 to 30 HZ, under a higher loss coefficient as compared to Conventional Device.

The invention claimed is:

1. A vibration damper comprising:
   a first mounting member having substantially cylindrical shape, and connected to one of a vibration generation section and a vibration receiving section;
   a second mounting member arranged radially inside of the first mounting member, and connected to the other of the vibration generation section and the vibration receiving section;
   an intermediate cylinder member fitted to an inner peripheral surface of the first mounting member, and having an opening extending therethrough;
   an elastic body arranged between the intermediate cylinder member and the second mounting member, for connecting the intermediate cylinder member and the second mounting member so as to be elastically deformable relative to each other;
   a first pressure receiving liquid chamber arranged in-radially inside of the intermediate cylinder member, having an inner wall that is at least partly formed by the elastic body, and adapted to be filled with a liquid;
   an auxiliary liquid chamber in communication with the first pressure receiving liquid chamber, having a partition wall that is partly deformable so as to change its internal volume upon a change in the liquid pressure; and
   a pair of second pressure receiving liquid chambers formed by the elastic body and being formed on both sides of the intermediate cylinder member, and adapted to be filled with the liquid;
   wherein a portion of the elastic body forms a partition wall portion arranged in a region of the elastic body corresponding to the opening of the intermediate cylinder member so as to partition the pair of the second pressure receiving liquid chambers, and
   wherein the partition wall portion is not adhered to the intermediate cylinder member.

2. The vibration damper according to claim 1, wherein the pair of the second pressure receiving liquid chambers are in communication with the auxiliary liquid chamber, respectively.

3. The vibration damper according to claim 1, wherein the partition wall portion of the elastic body is fitted in the opening of the intermediate cylinder member so as to project from the opening toward the side of the first mounting member.

4. The vibration damper according to claim 1, wherein the intermediate cylinder member has a pair of said openings, and both end regions of the partition wall portion of the elastic body are fitted into the pair of the openings, respectively.

5. The vibration damper according to claim 1, wherein the first pressure receiving liquid chamber is arranged adjacent to an end portion of the second mounting member, and the second pressure receiving liquid chambers forming the pair are arranged symmetrically, on both sides of the second mounting member.

6. The vibration damper according to claim 1, wherein the region of the elastic body projecting from the opening of the intermediate cylinder and the side of the first mounting member are in pressure contact with each other without being adhered to each other.

7. The vibration damper according to claim 1, further comprising passages for communicating the pair of the second pressure receiving liquid chambers to the auxiliary liquid chamber, respectively, wherein these passages are tuned to correspond to a frequency of an idling vibration, which is higher than a frequency of a shaking vibration.

8. The vibration damper according to claim 1, further comprising passages for communicating the pair of the second pressure receiving liquid chambers to the auxiliary liquid chamber, wherein the passages are different in flow resistance from each other.

9. The vibration damper according to claim 8, wherein one of the passages for communicating the pair of the second pressure receiving liquid chambers to the auxiliary liquid chamber is tuned to correspond to a frequency of a shaking frequency, and the other of the passages is tuned to correspond to a frequency of an idling vibration, which is higher than a frequency of the shaking vibration.

* * * * *